US006863397B2

(12) United States Patent
Nakano

(10) Patent No.: US 6,863,397 B2
(45) Date of Patent: Mar. 8, 2005

(54) OPTICAL ELEMENT AND EYEGLASS LENS

(75) Inventor: Satoshi Nakano, Hachioji (JP)

(73) Assignee: Konica Corporation (JP)

(*) Notice: Subject to any disclaimer, the term of this patent is extended or adjusted under 35 U.S.C. 154(b) by 146 days.

(21) Appl. No.: 09/905,519

(22) Filed: Jul. 13, 2001

(65) Prior Publication Data
US 2002/0024705 A1 Feb. 28, 2002

(30) Foreign Application Priority Data

Jul. 17, 2000 (JP) .................................... 2000-216254

(51) Int. Cl.$^7$ ................................................ G02C 7/10
(52) U.S. Cl. ................................... 351/163; 351/159
(58) Field of Search ................................ 351/163, 165, 351/159, 44–45; 359/361; 428/411.1; 427/162, 164–165

(56) References Cited

U.S. PATENT DOCUMENTS

| 5,225,244 A | * | 7/1993 | Aharoni et al. ............. 427/240 |
| 5,332,618 A | * | 7/1994 | Austin ........................ 428/216 |
| 5,428,409 A | * | 6/1995 | Silverstein .................... 351/45 |
| 5,619,288 A | * | 4/1997 | White et al. ................. 351/159 |
| 5,926,310 A | * | 7/1999 | Tamura et al. .............. 359/350 |
| 5,949,518 A | * | 9/1999 | Belmares et al. ............ 351/166 |
| 6,102,539 A | * | 8/2000 | Tucker ......................... 351/44 |
| 2002/0122962 A1 | * | 9/2002 | Arfsten et al. .............. 428/697 |
| 2003/0179343 A1 | * | 9/2003 | Marechal et al. ........... 351/159 |
| 2004/0156984 A1 | * | 8/2004 | Vitt et al. .................... 427/162 |

FOREIGN PATENT DOCUMENTS

| EP | 503976 A1 | * | 9/1992 |
| JP | 11-23804 | * | 1/1999 |
| JP | 11-258406 | * | 9/1999 |

* cited by examiner

Primary Examiner—Jordan M. Schwartz
(74) Attorney, Agent, or Firm—Muserlian, Lucas and Mercanti

(57) ABSTRACT

An optical element, comprises a base material; and a layer formed on at least one of surfaces of the base material. A reflectance of a surface of the formed layer for all light rays in a wavelength region of 280 nm to 315 nm and in a wavelength region of 420 nm to 680 nm is smaller than a reflectance of a surface of the base material.

18 Claims, 6 Drawing Sheets

OPTICAL ELEMENT AND EYEGLASS LENS

BACKGROUND OF THE INVENTION

The present invention relates to an optical element and an eyeglass lens having a so-called reflection preventing layer (antireflection layer).

It is well known that generally, ultraviolet rays exhibit strong chemical action, and occasionally degrade the durability of various substances or elements and functions associated with them.

Further, ultraviolet sun rays, which reach the surface of the Earth's surface after have been transmitted through the atmosphere, are mainly divided into deep ultraviolet rays termed "UV-B", having a wavelength in the region of from 280 to 315 nm, and near ultraviolet rays termed "UV-A", having a wavelength in the region of from 315 to 400 nm. It is noted that these ultraviolet rays exhibit high potential of injury to human eyes.

At present, widely employed as a means to minimize the entrance of these ultraviolet rays into the interior of human eyes are sunglasses (including eyeglasses) due to the ease of use.

Further, many recent eyeglass lenses, other than sunglasses, comprise UV absorbers in the lens itself and are subjected to UV absorbing coating.

By utilizing such lenses for corrective eyeglasses, it is possible to shield from or minimize ultraviolet rays which come from the line of sight. Recently, however, it has been verified that ultraviolet rays which come from a direction other than in the line of sight such as, for example, those which are reflected from the face surface, reflected from the back surface of the lens, and the like, result in much more injurious effects to human eyes than have been expected.

SUMMARY OF THE INVENTION

From the view of the foregoing, the present invention has been accomplished. An objective of the present invention is to provide an optical element comprising a layer capable of exhibiting a reflection preventing effect (antireflection effect) against light rays having a specified wavelength region and capable of decreasing injurious effects due to the light rays which is reflected from a surface.

Another objective of the present invention is to provide an eyeglass lens capable of decreasing the amount of ultraviolet rays which enter human eyes, as well as of effectively protecting eyes from ultraviolet rays.

The above objectives of the present invention can be attained by the following structures.

(1-1) An optical element, comprises:
  a base material; and
  a layer formed on at least one of surfaces of the base material;
  wherein a reflectance of a surface of the formed layer for all light rays in a wavelength region of 280 nm to 315 nm and in a wavelength region of 420 nm to 680 nm is smaller than a reflectance of a surface of the base material.

(1-2) In the optical element of (1-1), the layer is made of substantially an inorganic material.

(1-3) In the optical element of (1-1), a surface resistance of the layer is 1 MΩ/cm$^2$ or less.

(1-4) In the optical element of (1-1), the base material is a lens and the layer is formed on an image side-entire surface of the lens.

(1-5) In the optical element of (1-4), the base material is a lens for an eyeglass and the layer is formed on an eye side-entire surface of the lens.

(1-6) In the optical element of (1-1), a reflectance of a surface of the formed layer for all light rays in a wavelength region of 280 nm to 400 nm and in a wavelength region of 420 nm to 680 nm is smaller than a reflectance of a surface of the base material.

(1-7) In the optical element of (1-1), a reflectance of a surface of the formed layer for all light rays in a wavelength region of 280 nm to 700 nm is smaller than a reflectance of a surface of the base material.

(1-8) In the optical element of (1-1), an absorptivity of the base material for at least a part of light rays in a wavelength of 280 nm to 400 nm is 30% or more.

(1-9) In the optical element of (1-1), the base material has a selective absorptivity to absorb selectively a part of light rays in a wavelength region of 400 to 700 nm.

(1-10) In the optical element of (1-1), the layer is a multi layer having plural layers.

(1-11) In the optical element of (1-1), the layer comprises a transparent conductive layer.

(1-12) In the optical element of (1-1), the transparent conductive layer contains indium oxide.

(1-13) In the optical element of (1-1), the layer comprises a metallic layer.

(1-14) In the optical element of (1-1), a luminous transmittance of the layer is 90% or more.

(1-15) In the optical element of (1-1), a luminous transmittance of the base material and the layer is 75% or less.

(1-16) In the optical element of (1-1), a difference between a luminous reflectance one surface and a luminous reflectance on the other one surface of the optical element is 1% or less.

(1-17) In the optical element of (1-1), a spectral transmittance of the layer for all light rays in a wavelength region of 400 nm to 700 nm is 98% or more.

(1-18) In the optical element of (1-1),
  the base material is a lens,
  the layer is formed on an image side surface of the base material and
  another layer is formed on an object side surface of the base material, and
wherein a difference between a wavelength showing a peak of a spectral reflectance on the image side surface and a wavelength showing a peak of a spectral reflectance on the object side surface in a wavelength region of 450 nm to 680 nm is ±5% or less and a difference between a peak reflectance on the image side surface and a peak reflectance on the object side surface in a wavelength region of 450 nm to 680 nm is 1% or less.

(1-19) An eyeglass, comprises:
  a lens comprising
    a base material, and
    a layer formed on at least one of surfaces of the base material; and
  a lens holder to hold the lens;
  wherein a reflectance of a surface of the formed layer for all light rays in at least one of a wavelength region of 280 nm to 315 nm and in a wavelength region of 420 nm to 680 nm is smaller that a reflectance of a surface of the base material.

(1-20) In the eyeglass of (1-19), the layer is formed on an eye side-entire surface of the base material.

Further, the above objectives of the present invention may be achieved by the following preferable structures.

(2-1) In an optical element comprised of a base material and a layer which is formed on at least one part of the surface of the base material,
  the layer is substantially comprised of an inorganic material, and the reflectance of the entire light rays in the wavelength region of from 280 to 315 nm, as well as from 420 to 680 nm on the surface of the formed layer is less than that on the surface of the base material itself.

(2-2) In an optical element comprised of a base material and a layer which is formed on at least one part of the surface of the base material, the reflectance of the entire light rays in the wavelength region of from 280 to 315 nm, as well as from 420 to 680 nm on the surface of the formed layer is less than that on the surface of the base material itself, and the surface resistivity of the layer is no more than 1 M$\Omega$/cm$^2$.

(2-3) In an optical element comprised of a base material and a layer which is formed on at least one part of the surface of the base material, the reflectance of the entire light rays in the wavelength region of from 280 to 315 nm, as well as from 420 to 680 nm on the surface of the formed layer is less than that on the surface of the base material itself, and the layer is formed on the surface which is to be the image surface of the layer.

(2-4) In the optical element described in (2-2) or (2-3), the layer is substantially comprised of an inorganic material.

(2-5) In the optical element described in (2-1) or (2-3), the layer has a surface resistivity of no more than 1 M$\Omega$/cm$^2$.

(2-6) In the optical element described in any of (2-1) through (2-5), the reflectance of the entire light rays in the wavelength region of from 280 to 315 nm, as well as from 420 to 680 nm on the surface of the formed layer is less than that on the surface of the base material itself.

(2-7) In the optical element described in any of (2-1) through (2-5), the reflectance of the entire light rays in the wavelength region of from 280 to 315 nm on the surface of the formed layer is less than that on the surface of the base material itself.

(2-8) In the optical element described in any of (2-1) through (2-7), the layer has a luminous transmittance of at least 90 percent.

(2-9) In the optical element described in any of (2-1) through (2-8), the layer has a spectral transmittance of at least 98 percent to the entire light rays in the wavelength region of from 400 to 700 nm.

(2-10) In the optical element described in any of (2-1) through (2-9), the base material has an absorbance of at least 30 percent to some light rays in the wavelength region of from 280 to 400 nm.

(2-11) In the optical element described in any of (2-1) through (2-10), the base material exhibits a selective absorption characteristic which selectively absorbs some light rays in the wavelength region of from 400 to 700 nm.

(2-12) In the optical element described in any of (2-1) through (2-11), the base material has a luminous transmittance of no more than 75 percent.

(2-13) In the optical element described in any of (2-1) through (2-12), the difference in luminous reflectance between the surface of the object side and the surface of the image side is within 1 percent.

(2-14) In the optical element described in any of (2-1) through (2-13), the layer is comprised of a multilayer which comprises at least one layer which absorbs at least some light rays in the wavelength region of 280 to 400 nm.

(2-15) In the optical element described in any of (2-1) through (2-14), the layer is comprised of a multilayer which comprises at least one electrically conductive transparent layer.

(2-16) In the optical element described in any of (2-1) through (2-15), the electrically conductive transparent layer is mainly comprised of indium oxide.

(2-17) In the optical element described in any of (2-1) through (2-16), the layer is comprised of a multilayer which comprises at least one metallic layer.

(2-18) In the optical element described in any of (2-1) and (2-2), and (2-4) through (2-17), the layer is formed on one surface which becomes the surface of the image side of the base material.

(2-19) In the optical element described in (2-3) or (2-18), an ultraviolet reflection layer is formed on the surface opposite to the surface of the object side of the base material, and the reflectance of the entire light rays in the wavelength region of from 280 to 400 nm on the surface of the ultraviolet reflection layer formed as above is more than that on the surface of the base material itself.

(2-20) In the optical element described in (2-1) or (2-19), a layer is formed on the surface of the object side as well as on the surface of the image side of a base material; the difference in the wavelength which shows the peak of the spectral reflectance on the surface of the object side and the surface of the image side is to be within ±5 percent, and the difference of the peak reflectance is to be within 1 percent.

By employing the optical element, reflectance on the surface of a formed layer of light rays of the specified wavelength region becomes less than that on the surface of the base material itself. As a result, the optical element results in a decrease in effects due to reflected light rays.

Further, in the case of eyeglass lenses, reflection of ultraviolet rays, especially deep ultraviolet rays which come from behind the line of sight is assuredly minimized on the back surface of the lens. As a result, the amount of ultraviolet rays, which enter the interior of the eyes, decreases.

As previously described, the layer is substantially comprised of inorganic materials. Accordingly, the optical element results in sufficiently high surface hardness as well as high durability.

Further, the optical element can exhibit excellent antistatic effects due to the surface resistivity of the layer of no more than 1 M$\Omega$/cm$^2$. Consequently, it is possible to prevent or minimize adhesion of dust on the surface of the optical element.

Furthermore, by forming a layer on the surface which becomes the surface of the image side of the optical element, it is possible to decrease effects due to reflected light rays on the surface to an optical element, a light rays receiving element, or the like.

DETAILED DESCRIPTION OF THE PREFERRED EMBODIMENTS

Figure 1:
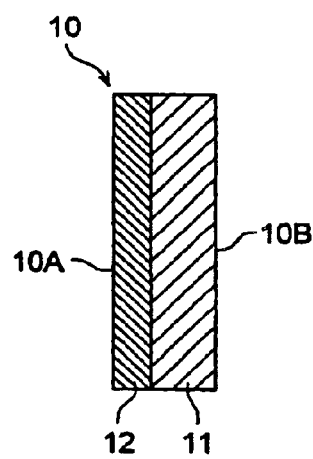
FIG. 1 is a cross-sectional view showing one example of the constitution of the optical element of the present invention.

The present invention will now be detailed.

The optical element of the present invention comprises a base material as well as a layer which is formed on at least one part of the surface of the base material. In addition, reflectance of the entire light rays in at least one of the wavelength region of from 280 to 315 nm, and the wavelength region of from 420 to 680 nm on the surface of the formed layer is less than that on the surface of the base material. Further, it is preferable that reflectance of the entire light rays in the wavelength region of from 280 to 400 nm as well as in the wavelength region of from 420 to 680 nm on the surface of the formed layer is allowed to be less than that on the surface of the base material. It is more preferable that reflectance of the entire light rays in the wavelength region of from 280 to 700 nm on the surface of the formed layer is allowed to be less than that on the surface of the base material. The reflectance, as described herein, refers to reflectance of vertical incident light rays on the optical element.

Incidentally, the case that light rays comes to be incident obliquely on the optical element is explained bellow.

When light is obliquely incident to the substrate, regarding polarized light component P, reflectance deceases until the incident angle reaches a Brewster's angle. When said incident angle exceeds the Brewster's angle, polarized light component P abruptly increases. On the other hand, regarding polarized light component S, as the incident angle increases, the resultant reflectance also increases. As a result, as said incident angle increases, the average reflectance of said polarized light component P and said polarized light component S increases. For example, sunlight is comprised of uniform polarized light components. As a result, the reflectance of the light, which is directly incident onto the surface of optical elements, is equal to the average reflectance. Thus, it is possible to design a reflection preventing layer so as to match the above. However, for those (once reflected light, laser beams, and the like) in which the ratio of polarized light component is not 1, it is necessary to design said reflection preventing layer, taking into account said polarized light component.

Said reflection preventing layer is also subjected to variation of reflection characteristics with respect to oblique incident light. A rough trend is that the spectral reflection curve of the average reflectance shifts to the short wavelength region while slightly increasing said reflectance. Accordingly, in order to correspond to a large incident angle, it is preferable to design and produce said reflection preventing layer, anticipating the shift of the spectral reflectance due to the variation of incident angle. It is also preferable to design so as to realize low reflection in the wide wavelength region in the case of vertical incidence. However, such a design results in an increase in the number of layers as well as in an increase in cost. Therefore, design is effective in which the antireflection performance is sacrificed, for example, in the wavelength region which results in less injury to human eyes as well as less visual contribution. For example, the weighted ratio of the longer wavelength region, specifically at least 660 nm of the visible range, in the ISO formula to obtain luminous transmittance, is approximately 0.5 percent of the total, and the spectral characteristics of said reflection preventing layer do not give major effects to said luminous transmittance. Accordingly, at the oblique incidence, it is preferable to design said reflection preventing layer so that less reflectance of light having a wavelength of shorter than 660 nm than that of the substrate is realized.

The layer may substantially be comprised of inorganic materials. Incidentally, the definition "is made of substantially an inorganic material" means "contains an inorganic material 90% or more". Further, the layer may be comprised of a multilayer, being a plurality of layers. Further, the layer may comprise an electrically conductive transparent layer comprised of indium oxide and the like. Still further, the layer may be comprised of a metallic layer. Further yet, the surface resistivity of the layer may be no more than 1 $M\Omega/cm^2$ and is preferably from 500 $\Omega/cm^2$ to 1 $M\Omega/cm^2$.

Further, the base material is to be a lens, and the layer is preferably formed on one surface which becomes the surface of the image side of the base material. In addition, the optical element of the present invention is most suitably employed as eyeglass lenses. Specifically, when the base material is to be for eyeglass lenses, the layer is preferably formed on one surface which becomes the surface of the eye side of the base material. Eyeglasses are comprised of lenses, which are the optical element of the present invention, and a lens holding member.

Further, the base material may have an absorbance of at least 30 percent for at least one part of the light rays in the wavelength region of from 280 to 400 nm. Further, the base material may have a selective absorption characteristic which selectively absorbs at least one part of the light rays in the wavelength region of from 400 to 700 nm.

Further, the luminous transmittance of the layer is preferably at least 90 percent. Still further, the luminous transmittance of the base material may be no more than 75 percent. Specifically, when employed as sunglasses, it is suitable that the luminous transmittance of the base material and layer is to be no more than 75 percent.

FIG. 1 is a cross-sectional view showing one example of the constitution of the optical element of the present invention.

The optical element 10 comprises a light ray transmittable plate-shaped base material 11 and a layer 12 formed on one surface of the base material 11.

The layer 12 is preferably formed on an entire surface which becomes surface 10A of the image side of optical element 10.

"A surface of the image side (an image side surface)", as described herein, refers to the surface positioned on the side nearest an imaging system such as, for example, a sensor, CCD, eye, or the like in optical element 10. For example, in an eyeglass lens, the surface of the image side refers to the back surface of the lens positioned on the eye side. On the other hand, "a surface of the object side (an object side surface)" refers to a surface (shown as 10B in FIG. 1) from which light rays outgo. That is, the light rays come into the surface of the image side from the image side, transmits through the surface of the image side and outgo from the surface of the object side. For example, in an eyeglass lens, the surface to the object side corresponds to the front surface of the lens positioned at the opposite side of the surface of the eye side.

By forming layer 12 on the entire surface, which becomes surface 10A on the image side of optical element 10, it is possible to decrease adverse effects due to reflected light rays on the surface 10A on the image side for other optical elements or light ray receiving elements which are arranged on the image side.

Base material 11 itself is an optical member which exhibits functions as an optical element bearing specified optical properties such as, for example, an optical lens, a filter, a prism, a diffraction grating, a near field optical element, a light rays introducing plate, and the like.

Listed as materials constituting base material 11 may be, for example, light rays transmitting organic materials such as acrylic resins, polycarbonate resins, norbornane based resins, polyester resins, polyethylene terephthalate resins, polyimide resins, polyethylene naphthalate resins, polyether sulfone resins, polyolefin based resins, and the like, or light rays transmitting inorganic materials such as quartz glass, soft glass, borosilicate glass, and the like.

Layer 12 of the optical element 10 exhibits reflectance on the formed surface for the entire light rays range at wavelengths of from 280 to 315 nm as well as of from 420 to 680 nm, which is less than that on the surface of base material 11 itself. Namely, the layer 12 exhibits a reflection preventing function to counter light rays in the specified wavelength region by being formed on base material 11. Hereunder, such a layer is called "a reflection preventing layer".

In optical element 10, which is subjected to formation of reflection preventing layer 12, reflectance on surface 10A of the image side is sufficiently small. As a result, the amount of reflected light rays from the image side of the optical element 10 on surface 10A of the image side becomes sufficiently small.

Accordingly, adverse effects, due to reflected light rays on surface 10A of the image side against optical elements or light ray receiving elements arranged on the image side of optical element 10, are minimized.

It is possible to constitute reflection preventing layer 12 in such a manner that a plurality of layers, in which each layer is substantially comprised of inorganic materials is laminated in the form of a multilayer.

Further, it is possible to obtain desired optical functions by forming a suitable laminated layer, employing materials having different refractive indices while taking into account materials, thickness and other conditions of each constituent layer.

By constituting reflection preventing layer 12 utilizing inorganic materials, it is possible to form the reflection preventing layer 12 into a very dense structure. As a result, it is possible to provide high surface hardness as well as excellent durability to optical element 10. Namely, when only one of the layers is constituted employing materials such as, for example, resins, it is impossible to obtain sufficient strength as a whole.

The number of layers, the thickness of each layer, and the order of layers in the multilayer are not particularly limited, and they may be determined based on desired optical functions.

Inorganic materials constituting reflection preventing layer 12 are not particularly limited, and include, for example, oxides of metals such as, for example, silicon, titanium, tantalum, zirconium, cerium, hafnium, yttrium, aluminum, magnesium, praseodymium, neodymium, and the like; fluorides of metals such as magnesium, lanthanum, neodymium, calcium, cerium, aluminum, sodium, lead, yttrium, and the like; zinc sulfide; mixture and compounds thereof, or mixtures of metals with these compounds; and the like.

Methods for forming each layer constituting reflection preventing layer 12 are also not particularly limited. Specifically, vapor phase deposition methods, such as an evaporation method are preferred, and listed may be a vacuum deposition method, an ion plating method, a sputtering method, a CVD method, and the like.

Base material 11 of optical element 10 is preferably comprised of materials having an absorbance of at last 30 percent for any light rays in the wavelength region of from 280 to 400 nm (being the ultraviolet region).

By utilizing such materials, it is possible to ensure minimal ultraviolet rays which come from surface 10A of the image side by reflecting the ultraviolet rays on surface 10B of the object side of optical element 10. Accordingly, in addition to the reflection preventing function of reflection preventing layer 12 of ultraviolet ray, base material 11 exhibits an ultraviolet ray absorption function. As a result, it is possible to decrease adverse effects of ultraviolet rays on the optical elements and the like, which are arranged on the image side of optical element 10.

Further, base material 11 can be provided with selective absorption characteristics, which selectively absorb at least a part of light in the wavelength region of from 400 to 700 nm (being the visible region).

In this case, it is possible to lower the intensity of visible light at wavelengths which result in flickering for human eyes, or which is unnecessary for sensors and the like. As a result, in addition to reflection preventing functions due to reflection preventing layer 12, base material 11 exhibits visible light absorbing functions, whereby it is possible to ensure a decrease adverse in effects due to unnecessary visible light.

Further, a luminous transmittance of the base material 11 may be made not larger than 75%. In this case, the light ray coming from the object side of the optical element is shaded by the base material 11 and a amount of light ray emitted from the surface 10A at the image side of the optical element can be reduced. Therefore, the bad influence for human eyes at the image side of the optical element 10 can be reduced.

The luminous transmittance is defined in JIS T7330-15.4 and also called as "luminous transmittance factor.

The surface resistivity of reflection preventing layer 12 is preferably no more than 1 M$\Omega$/cm$^2$, and is more preferably no more than 200 $\Omega$/cm$^2$.

By adjusting the surface resistivity to no more than 1 M$\Omega$/cm$^2$, it is possible to provide excellent antistatic effects to optical element 10. Due to that, it is possible to minimize the adhesion of dust and the like onto the surface of optical element 10. Further, when the surface resistivity is no more than 200 $\Omega$/cm$^2$, it is possible to provide high electrical conductivity to the reflection preventing layer 12 and also to provide an electromagnetic wave decreasing function to optical element 10.

The luminous transmittance of reflection preventing layer 12 itself is preferably at least 90 percent. Due to that, reflection preventing layer 12 effectively works to visually ensure sufficient brightness, and can effectively minimize adverse effects against color reproduction properties. Further, reflection preventing layer 12 itself preferably exhibits a spectral transmittance of at least 98 percent for light (being the visible light) having a wavelength of from 400 to 700 nm. Due to that, reflection preventing layer 12 exhibits sufficiently high light transmittance whereby it is possible to provide an optical element which results in excellent color reproduction properties.

Reflection preventing layer 12 may have a layer configuration comprising at least one layer which absorbs light rays (ultraviolet rays) having a wavelength of from 280 to 400 nm.

In this case, even though ultraviolet rays from the image side of optical element 10 are reflected on surface 10B on the object side, the ultraviolet rays are absorbed by reflection preventing layer 12. As a result, the amount of ultraviolet rays, which come from surface 10A on the image side of optical element 10 decreases, whereby it is possible to also decrease adverse effects on the optical elements and the like which are arranged on the image side of optical element 10.

Reflection preventing layer 12 may have a layer configuration comprising at least one metallic layer.

Listed as metallic materials, which constitute the metallic layer are, for example, aluminum, chromium, platinum, silver, and mixtures thereof.

The optical layer thickness of the metallic layer is preferably from 1 to 10 nm.

When reflection preventing layer 12 has a layer configuration comprising a metallic layer, the reflection preventing layer 12 may result in an antistatic function as well as an electromagnetic wave reducing function.

Reflection preventing layer 12 may also have a layer configuration comprising at least one electrically conductive transparent layer which exhibits light rays transmitting properties as well as electrical conductivity.

Listed as materials which constitute the electrically conductive transparent layer are, for example, materials such as indium oxide, tin oxide, zinc oxide, and the like, and mixtures thereof, or mixtures of these materials with metals. Listed as the metals are aluminum, chromium, platinum, gold, silver, copper, and the like.

The electrically conductive transparent layer is preferably comprised of, for example, indium oxide in a content ratio of at least 80 percent by weight; is more preferably comprised of a mixture consisting of indium oxide and tin oxide; and is most preferably comprised of a mixture consisting of indium oxide in a content ratio of at least 90 percent by weight and tin oxide in a content ratio of at most 10 percent by weight. By so doing, it is possible to assuredly adjust the electrical conductivity of the electrically conductive transparent layer to at most 200 $\Omega/cm^2$.

Further, the optical thickness of the electrically conductive transparent layer is preferably from 5 to 300 nm.

When reflection preventing layer 12 has a layer configuration comprising an electrically conductive transparent layer, it is possible to provide the reflection preventing layer with an antistatic function as well as an electromagnetic wave decreasing function, and it is also possible to obtain high transmittance compared to one having a layer configuration comprising only a metallic layer.

In the optical element 10, the difference in luminous reflectance between surface 10B of the object side and surface 10A of the image side is preferably within one percent. Due to that, it is possible to retain a good appearance without causing color difference on both sides of the optical element 10.

The optical element of the present invention may be constituted in such a manner that an ultraviolet reflecting layer is formed on the surface (10B in the constitution of FIG. 1) of the object side so that reflectance of the entire light rays range at the wavelengths (being the ultraviolet region) of from 280 to 400 nm, is more than that on the surface of the base material itself. In this case, entrance of ultraviolet rays, which come from the object side of the optical element, into the optical element, is minimized.

The optical element of the present invention may also be constituted in such a manner that the reflection preventing layer is formed on both of the surfaces of the object side of the base material and the surface of the image side. In this case, it is preferable that any difference in wavelength, which shows the peak position of the spectral reflectance in the wavelength region of from 450 to 680 on the surface of the object side as well as the surface of the image side, be within ±5 percent, and any difference in peak reflectance be within one percent. Due to that, no color difference occurs on either surface of the optical element, and the desired appearance may also be retained.

In the optical element of the present invention, in view of an increase in the adhesive force or the surface hardness of the reflection preventing layer, a hard coat layer and a commonly known sublayer comprised of materials represented, for example, by silicone based thermohardening resins, and acryl based ultraviolet hardening resins may be provided on the surface of the base material.

Further, the employed base material may be tinted in the range which does not adversely affect light rays transmitting properties. Still further, plates and films may be stacked and laminated.

Optical elements as above may suitably be employed as various types of optical elements in, for example, eyeglass lenses, binoculars, telescopes, microscopes, opera glasses, head mount displays, and the like. Further, as described below, marked effects are particularly obtained when employed in eyeglass lenses.

<Eyeglass Lense>

The eyeglass lens of the present invention is formed employing the optical element. Specifically, the eyeglass lens is comprised of lens bodies as the base materials and the reflection preventing layer formed on one surface which becomes the surface of the image side of the lens body, namely on the opposite surface of the lens on the eye side.

When such eyeglass lenses are utilized, it is possible to effectively minimize the reflection of ultraviolet rays, which come from behind the line of sight, as well as ultraviolet rays reflected from the facial skin, on the opposite surface of the lens, and it is also possible to decrease the total amount of ultraviolet rays which enters the eye interior. As a result, it is possible to effectively protect eyes from ultraviolet rays.

Further, by forming a reflection preventing layer employing inorganic materials, it is possible to constitute the reflection preventing layer into a very dense structure, whereby it is possible to provide high surface hardness as well as excellent durability to eyeglass lenses.

Still further, by regulating the surface resistivity of the reflection preventing layer to no more than 1 M$\Omega/cm^2$, it is possible to result in excellent antistatic effects, whereby it is possible to minimize the adhesion of dust and the like on the surface of eyeglass lenses.

In the eyeglass lens of the present invention, layers having various optical functions such as, for example, an ultraviolet reflecting layer, an ultraviolet absorbing layer, and the like, may be provided on the surface opposite the surface of the object side of the lens main body, namely the front surface of the lens.

EXAMPLES

Examples of the present invention will now be specifically described. However, the present invention is not limited to these examples.

<Method for Forming Layers>

In the present examples, as described below, layers are formed employing a vacuum deposition method along with an ion plating method.

When the layer comprised of the materials, shown in Table 1 below, was formed, the vacuum deposition method was employed. Employed as deposition materials were the materials. Oxygen gas was introduced at a pressure shown in the central column and the deposition rate was regulated to the values in the right column so that formed layers were obtained with desired physical properties.

Herein, the degree of vacuum at the beginning of deposition was set at $1\times10^{-3}$ Pa. The base material heating temperature was set at 350° C. in the case of glass, and at 70° C. in the case of plastics. Further, when a metallic layer was formed, no gas was introduced.

TABLE 1

| Deposition Material | Inlet Gas Pressure (in Pa) | Deposition Rate (in Å/second) |
|---|---|---|
| Titanium Oxide (TiO$_2$) | $2.5 \times 10^{-2}$ | 3 |
| Hafnium oxide (HfO$_2$) | $1.5 \times 10^{-2}$ | 4 |
| Zirconium Oxide (ZrO$_2$) | $1.5 \times 10^{-2}$ | 4 |
| Tantalum Oxide (Ta$_2$O$_2$) | $1.5 \times 10^{-2}$ | 4 |
| Yttrium Oxide (Y$_2$O$_3$) | $1.5 \times 10^{-2}$ | 5 |
| Aluminum Oxide (Al$_2$O$_3$) | $1.5 \times 10^{-2}$ | 5 |
| Silicon Oxide (SiO$_2$) | $1 \times 10^{-2}$ to $2 \times 10^{-2}$ | 5 to 20 |
| Magnesium Fluoride (MgF$_2$) | not introduced | 10 |
| Silver (Ag) | not introduced | 4 |

An electrically conductive transparent layer was formed employing high frequency discharge ion plating under conditions, as described below, for example, while a mixture consisting of indium metal and tin metal, as the deposition material, was evaporated under vacuum. Herein, the deposition materials were regulated so that the content ratio of tin in the formed electrically conductive transparent layer was from 10 to 30 percent by weight.

Inlet oxygen gas pressure: $2.5\times10^{-2}$ Pa
Deposition rate: 3 Å/second
RF discharge power: 500 W Incidentally, the "RF" refers to high frequency of no more than 1 GHz.

<Measurement Methods>

(1) Spectral Transmittance

Spectral transmittance was measured employing Spectrophotometer "U-4000" (manufactured by Hitachi Seisakusho). Further, luminous transmittance was calculated employing measured spectral transmittance.

(2) Spectral Reflectance

Spectral reflectance was measured employing a 5° specular reflection apparatus of Spectrophotometer "U-4000" (manufactured by Hitachi Seisakusho). Further, samples having curvature such as, for example, lenses, and the like, were measured as follows. Measurement was carried out employing a Microscopic Spectrophotometer "USPM" (manufactured by Olympus Kogaku) equipped with a diaphragm in which a focal point was formed on the surface to be measured, and light rays reflected on the other surface was eliminated.

(3) Absorption Coefficient

Absorption coefficient was obtained based on the formula below, utilizing the spectral transmittance as well as the spectral reflectance obtained in (1) and (2) previously described.

Absorption=100−(spectral reflectance+spectral transmittance) (in percent)

(4) Refractive Index

The refractive index of a single layer formed on a test piece (a glass base material) under the same conditions as those of previously described deposition was measured employing a Spectral Ellipsometer "VASE" (manufactured by JA Uram Co.).

(5) Surface Resistivity

Surface resistivity was measured employing a 4-End Needle Probe (manufactured by Kyowa Riken). On the other hand, high surface resistivity was measured employing an Ultra Insulation Meter "SM-10E" (manufactured by Toa Denpa Kogyo). In this case, samples were prepared by forming the same layer as examples on a test piece (glass base material).

Example 1

Figure 2:
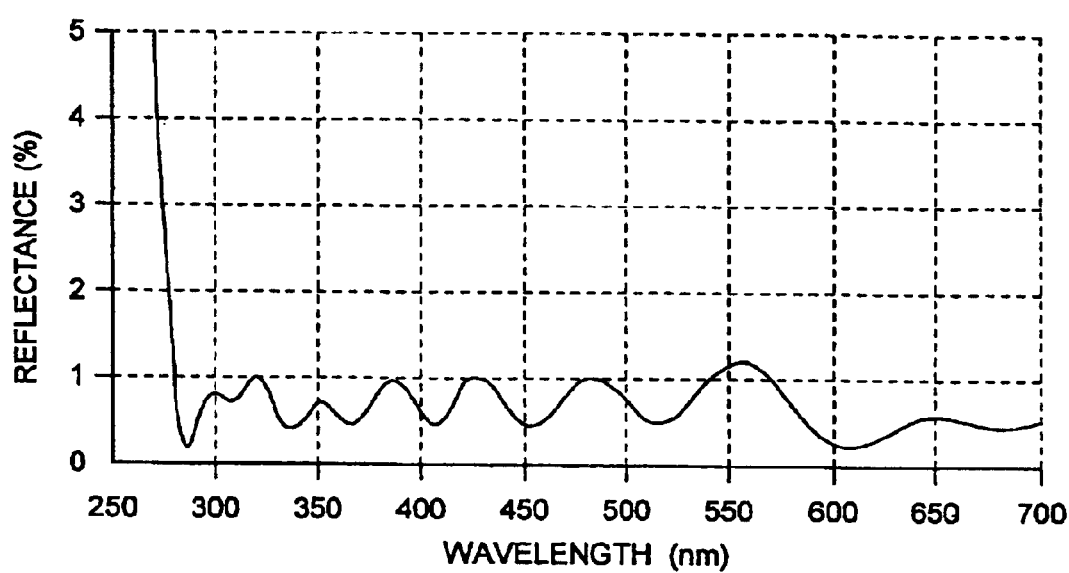
FIG. 2 is a spectral reflectance curve of the optical element prepared in Example 1.

After forming a sublayer (a hard coat layer) comprised of acryl based ultraviolet hardening resins on a base material comprised of polycarbonate resins, a multilayer comprised of the 10-layer structure, as shown in Table 2 below, was formed on the sublayer, whereby an optical element was prepared. The spectral reflectance of the optical element was measured and the spectral reflectance curve, shown in FIG. 2, was obtained. Then, it was found that the multilayer possessed reflection preventing effects in a wide range, from the ultraviolet region through the visible region.

Further, in Table 2, the refractive index of each layer was a value in terms of intended wavelength $\lambda_0$ regarding a single layer formed employing the same conditions as the deposition conditions previously described, and each layer thickness was at the intended thickness.

TABLE 2

| Layer | Layer Material | Refractive Index at $\lambda_0$ ($\lambda_0$ = 520 nm) | Optical Layer Thickness (in nd/$\lambda_0$) |
|---|---|---|---|
| First Layer | SiO$_2$ | 1.46 | 0.205 |
| Second Layer | TiO$_2$ | 2.27 | 0.074 |
| Third Layer | SiO$_2$ | 1.46 | 0.035 |
| Fourth Layer | TiO$_2$ | 2.27 | 0.240 |
| Fifth Layer | Y$_2$O$_3$ | 1.79 | 0.048 |
| Sixth Layer | TiO$_2$ | 2.27 | 0.074 |
| Seventh Layer | Y$_2$O$_3$ | 1.75 | 0.060 |
| Eighth Layer | SiO$_2$ | 1.46 | 0.059 |
| Ninth Layer | TiO$_2$ | 2.27 | 0.031 |
| Tenth Layer | SiO$_2$ | 1.46 | 0.411 |
| Resin Layer |  | 1.55 | — |
| Base Plate | PC | 1.58 | — |

Example 2

Figure 3:
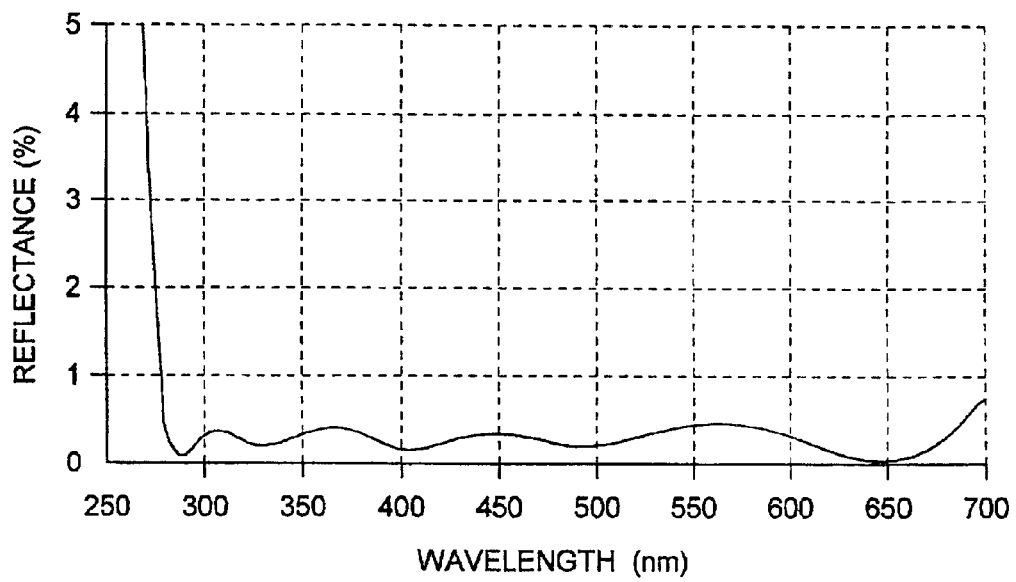
FIG. 3 is a spectral reflectance curve of the optical element prepared in Example 2.

A multilayer comprised of the 10-layer structure, as shown in Table 3 below, was formed on a base material comprised of glass (BK-7), whereby an optical element was prepared. The spectral reflectance of the optical element was measured and the spectral reflectance curve, shown in FIG. 3, was obtained. Then, it was found that the multilayer possessed reflection preventing effects in the wide range from the ultraviolet region through the visible region.

TABLE 3

| Layer | Layer Material | Refractive Index at $\lambda_0$ ($\lambda_0$ = 520 nm) | Optical Layer Thickness (in nd/$\lambda_0$) |
|---|---|---|---|
| First Layer | MgF$_2$ | 1.38 | 0.202 |
| Second Layer | TiO$_2$ | 2.34 | 0.061 |
| Third Layer | SiO$_2$ | 1.46 | 0.043 |
| Fourth Layer | TiO$_2$ | 2.34 | 0.275 |

TABLE 3-continued

| Layer | Layer Material | Refractive Index at $\lambda_0$ ($\lambda_0$ = 520 nm) | Optical Layer Thickness (in nd/$\lambda_0$) |
| --- | --- | --- | --- |
| Fifth Layer | $Y_2O_3$ | 1.79 | 0.028 |
| Sixth Layer | $TiO_2$ | 2.34 | 0.072 |
| Seventh Layer | $Y_2O_3$ | 1.79 | 0.088 |
| Eighth Layer | $SiO_2$ | 1.46 | 0.038 |
| Ninth Layer | $TiO_2$ | 2.34 | 0.027 |
| Tenth Layer | $SiO_2$ | 1.46 | 0.404 |
| Base Plate | BK-7 | 1.52 | — |

Example 3

Figure 4:
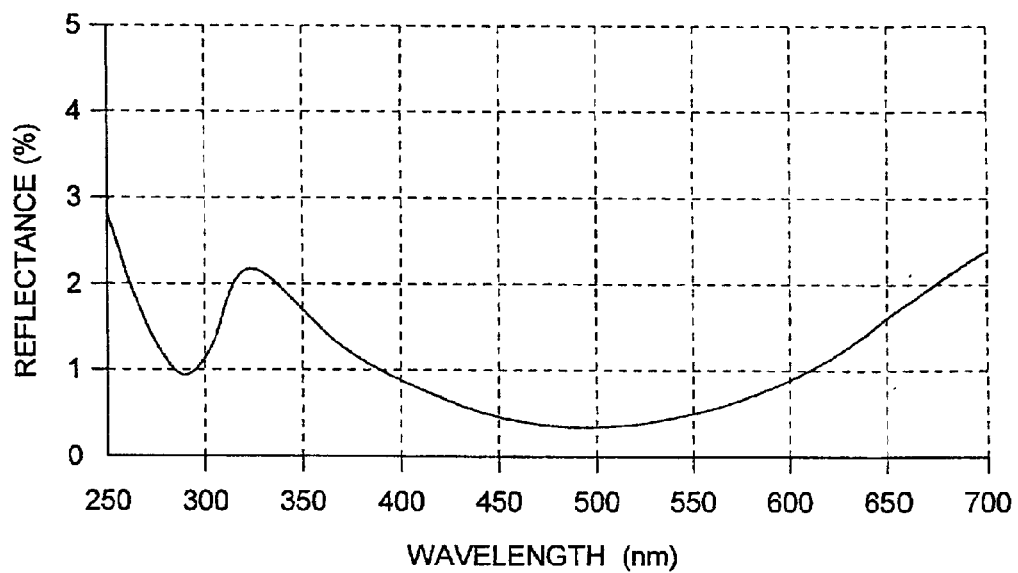
FIG. 4 is a spectral reflectance curve of the optical element prepared in Example 3.

A multilayer comprised of the 2-layer structure comprising a metallic layer comprised of silver as shown in Table 4 below, was formed on a base material comprised of polycarbonate resins, whereby an optical element was prepared. The spectral reflectance of the optical element was measured and the spectral reflectance curve, shown in FIG. 4, was obtained. Then, it was found that the multilayer possessed reflection preventing effects in the wide range from the ultraviolet region through the visible region. It was also found that the surface resistivity of the multilayer was 1 k$\Omega$/cm$^2$, and in addition, excellent antistatic effects were exhibited.

TABLE 4

| Layer | Layer Material | Refractive Index at $\lambda_0$ ($\lambda_0$ = nm) | Layer Thickness (in Å) |
| --- | --- | --- | --- |
| First Layer | $SiO_2$ | 1.46 | 470 |
| Second Layer | Ag | — | 32 |
| Base Plate | PC | 1.58 | — |

Example 4

Figure 5:
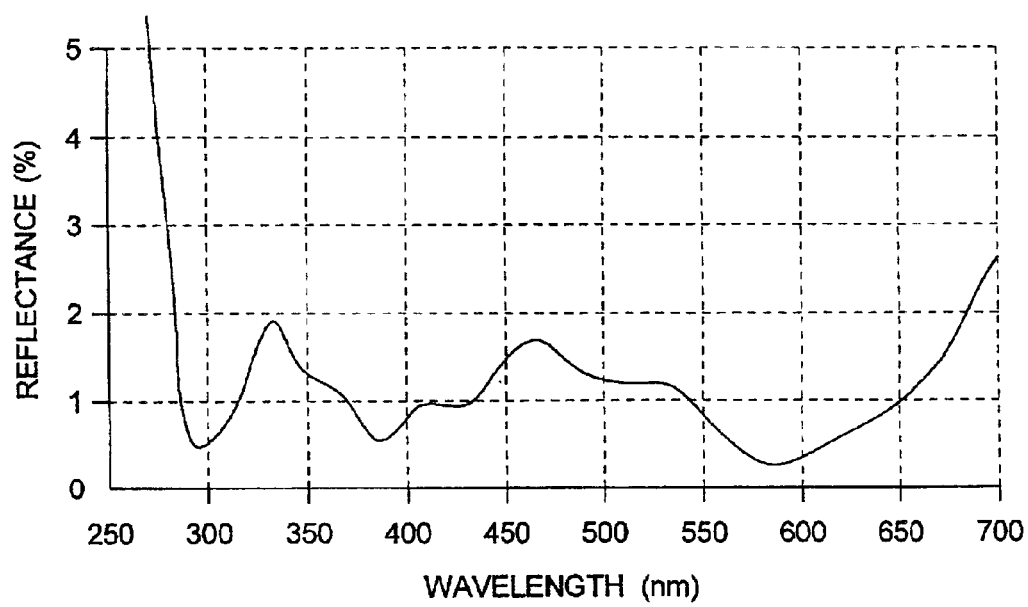
FIG. 5 is a spectral reflectance curve of the optical element prepared in Example 4.

After forming a sublayer (a hard coat layer) comprised of acryl based ultraviolet hardening resins on norbornane based resin A, a multilayer comprised of the 6-layer structure comprising an electrically conductive transparent layer comprised of ITO, as shown in Table 5 below, was formed on the sublayer, whereby an optical element was prepared. The reflectance of the optical element was measured and the spectral reflectance curve shown in FIG. 5 was obtained. Then, it was found that the multilayer possessed reflection preventing effects in the wide range from the ultraviolet region through the visible region. It was also found that the surface resistivity of the multilayer was 15 k$\Omega$/cm$^2$, and excellent antistatic effects were exhibited.

TABLE 5

| Layer | Layer Material | Refractive Index at $\lambda_0$ ($\lambda_0$ = 510 nm) | Optical Layer Thickness (in nd/$\lambda_0$) |
| --- | --- | --- | --- |
| First Layer | $SiO_2$ | 1.46 | 0.200 |
| Second Layer | $HfO_2$ | 1.95 | 0.202 |
| Third Layer | ITO | 2.06 | 0.080 |
| Fourth Layer | $HfO_2$ | 1.95 | 0.083 |
| Fifth Layer | $Y_2O_3$ | 1.76 | 0.160 |
| Sixth Layer | $SiO_2$ | 1.46 | 0.409 |
| Resin Layer | | 1.49 | — |
| Base Plate | Resin A | 1.52 | — |

Example 5

After forming a sublayer (a hard coat layer) comprised of silicone based thermohardening resins on one surface which became the surface of the image side (the surface on the eye side) of the base material for eyeglasses comprised of urethane based resin B comprising UV absorbers which absorb ultraviolet rays at wavelengths of from 280 to 400 nm in a ratio of 100 percent, a multilayer comprised of the 5-layer structure, comprising an electrically conductive transparent layer comprised of ITO, as shown in Table 6 below, was formed on the sublayer. Further, a multilayer comprised of the 5-layer structure, as shown in Table 7 below, was formed on the surface which became the surface of the object side opposite the surface on which the multilayer had been formed, whereby eyeglass lenses were prepared.

Figure 6:
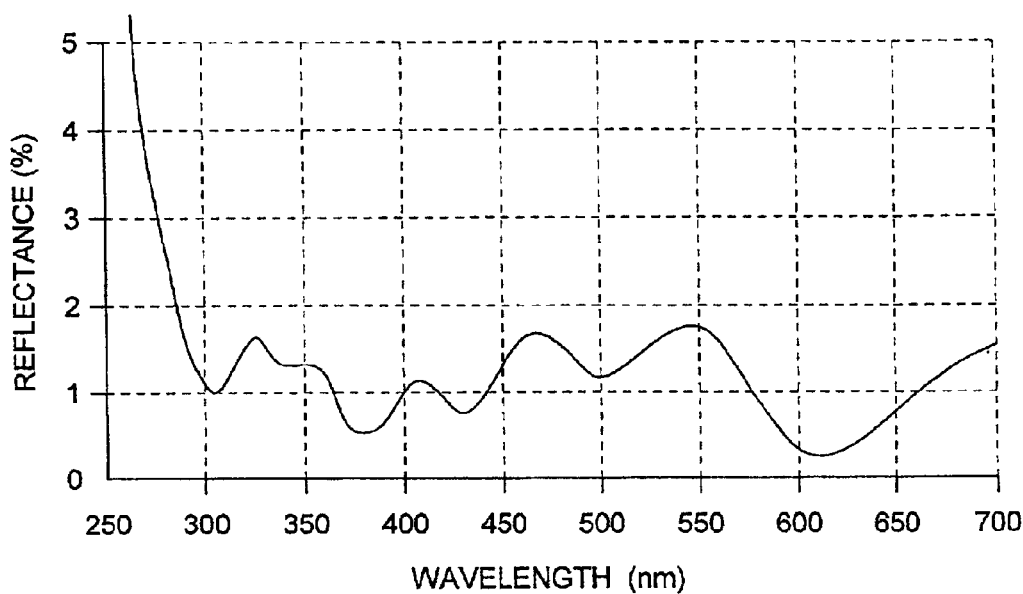
FIG. 6 is a spectral reflectance curve of the surface of the image side of the optical element prepared in Example 5.

The reflectance of the surface of the image side (the surface of the eye side) was measured and the spectral reflectance curve shown in FIG. 6 was obtained. Then, it was found that the multilayer possessed reflection preventing effects in a wide range from the ultraviolet region through the visible region. It was also found that the surface resistivity of the multilayer was 60 $\Omega$/cm$^2$, and excellent antistatic effects were exhibited.

Figure 7:
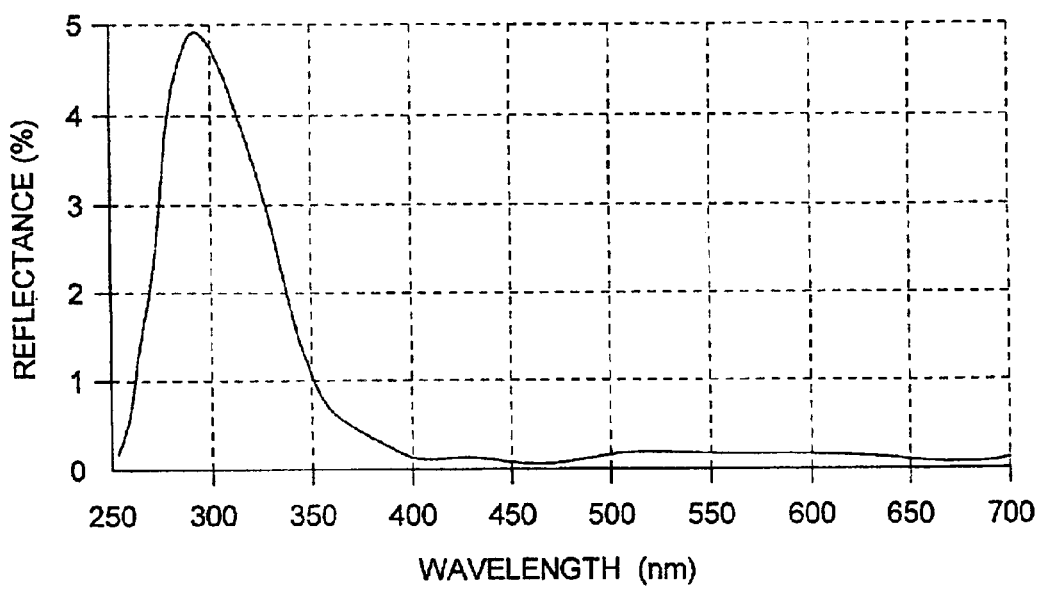
FIG. 7 is a spectral reflectance curve of the surface of the object side of the optical element prepared in Example 5.

Further, the reflectance of the surface of the object side of this optical element was measured and the spectral reflectance curve, shown in FIG. 7, was obtained. Then, it was found that the multilayer possessed high reflection preventing effects in the ultraviolet region, especially in the deep ultraviolet region (the UV-B region).

TABLE 6

| Layer | Layer Material | Refractive Index at $\lambda_0$ ($\lambda_0$ = 510 nm) | Optical Layer Thickness (in nd/$\lambda_0$) |
| --- | --- | --- | --- |
| First Layer | $SiO_2$ | 1.46 | 0.188 |
| Second Layer | $HfO_2$ | 1.95 | 0.140 |
| Third Layer | ITO | 2.06 | 0.250 |
| Fourth Layer | $Y_2O_3$ | 1.75 | 0.174 |
| Fifth Layer | $SiO_2$ | 1.46 | 0.398 |
| Resin Layer | | 1.55 | — |
| Base Plate | Resin A | 1.60 | — |

TABLE 7

| Layer | Layer Material | Refractive Index at $\lambda_0$ ($\lambda_0$ = 510 nm) | Optical Layer Thickness (in nd/$\lambda_0$) |
| --- | --- | --- | --- |
| First Layer | $SiO_2$ | 1.46 | 0.240 |
| Second Layer | $ZrO_2$ | 2.06 | 0.504 |
| Third Layer | $SiO_2$ | 1.46 | 0.081 |
| Fourth Layer | $ZrO_2$ | 2.06 | 0.062 |
| Fifth Layer | $SiO_2$ | 1.46 | 0.062 |
| Resin Layer | | 1.55 | — |
| Base Plate | Resin A | 1.60 | — |

Example 6

After forming a sublayer (a hard coat layer) comprised of silicone based thermohardening resins on one surface, which became the surface of the image side (the surface on the eye side) of the base material for eyeglasses comprised of urethane based thermohardening resin B comprising UV absorbers, a multilayer comprised of the 5-layer structure, comprising an ITO layer (an electrically conductive transparent layer), as shown in Table 8 below, was formed on the sublayer. Further, a multilayer comprised of the 5-layer structure, as shown in Table 7, was formed in the same manner as Example 5 on the surface which became the surface of the object side opposite the surface on which the multilayer had been formed, whereby eyeglass lenses were prepared.

Figure 8:
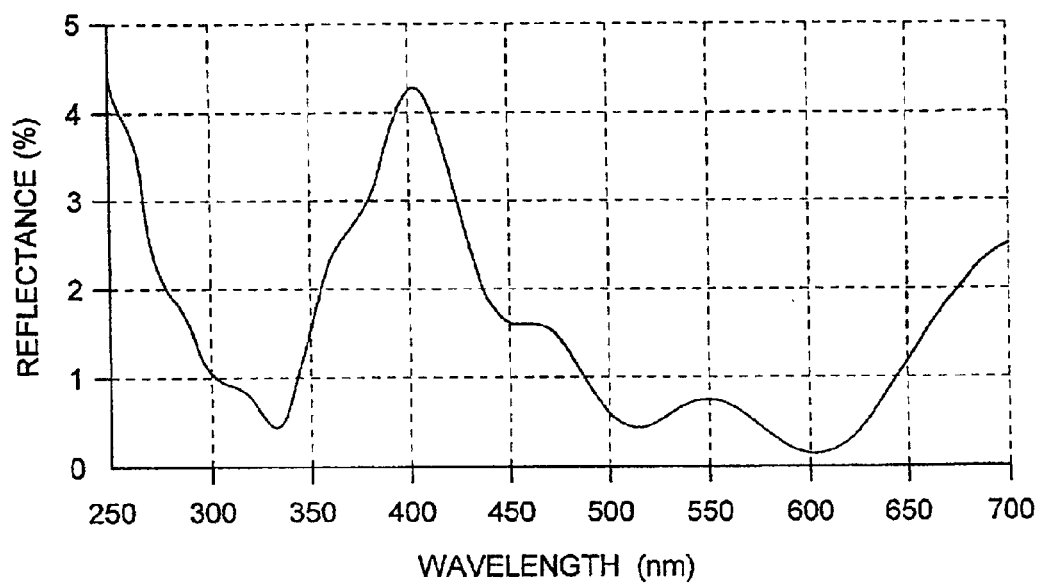
FIG. 8 is a spectral reflectance curve of the optical element prepared in Example 6.

The reflectance of the surface of the image side (the surface of the eye side) of the eyeglass lens was measured and the spectral reflectance curve, shown in FIG. 8, was obtained. Then, it was found that the multilayer possessed reflection preventing effects in a wide range from the ultraviolet region through the visible region. It was also found that the surface resistivity of the multilayer was 45 $\Omega/cm^2$, and excellent antistatic effects were exhibited.

Further, the reflectance of the surface of the object side of this optical element was measured. Then, it was found that the multilayer possessed high reflection preventing effects in the ultraviolet region, especially in the deep ultraviolet region (the UV-B region).

TABLE 8

| Layer | Layer Material | Refractive Index at $\lambda_0$ ($\lambda_0$ = 510 nm) | Optical Layer Thickness (in nd/$\lambda_0$) |
|---|---|---|---|
| First Layer | $SiO_2$ | 1.46 | 0.184 |
| Second Layer | $TaO_2$ | 2.09 | 0.048 |
| Third Layer | $Al_2O_3$ | 1.64 | 0.051 |
| Fourth Layer | ITO | 2.06 | 0.302 |
| Fifth Layer | $Al_2O_3$ | 1.64 | 0.200 |
| Sixth Layer | $SiO_2$ | 1.46 | 0.345 |
| Resin Layer | | 1.55 | — |
| Base Plate | Resin A | 1.60 | — |

As noted above, it was confirmed that the optical elements prepared in Examples 1 and 2 exhibited reflectance of no more than approximately 1 percent for all light rays having a wavelength in the region of from 280 to 700 nm on the surface of the formed multilayer, and possessed an excellent reflection preventing function.

It was confirmed that optical elements prepared in Examples 3 and 4 exhibited reflectance of nearly no more than approximately 2 percent for all light rays having a wavelength in the range of from 280 to 700 nm on the surface of the formed multilayer, and though the resulting reflectance was greater than that of optical elements prepared in Examples 1 and 2, they possessed a sufficient reflection preventing function as well as an excellent antistatic function and electromagnetic wave decreasing function.

It was confirmed that the optical element prepared in Example 5 exhibited reflectance of no more than 2 percent for the entire light rays having a wavelength in the region of from 280 to 700 nm on the surface which became the surface of the image side, and exhibited sufficiently high reflectance for ultraviolet rays on the surface of the object side, and possessed excellent reflection preventing function for light rays incident from the surface of the image side of the optical element, and possessed an excellent reflection function against ultraviolet rays incident from the surface of the object side.

Further, when the optical element is employed, for example, as eyeglass lenses, the base material possesses a high ultraviolet absorbing function. As a result, by combining the ultraviolet reflection preventing function and ultraviolet reflection function of the layer previously described, it is possible to greatly minimize the introduction of ultraviolet rays into the eye interior. Namely, it is possible to reflect the ultraviolet rays incident to the surface of the eye side (the front surface of the lens) from the atmosphere side on the surface of the eye side, utilizing the reflection preventing function of the layer, whereby it is possible to minimize the entrance of the ultraviolet rays into the eye interior. Further, by utilizing the ultraviolet absorbing function due to lens base materials, ultraviolet rays incident from the surface of the eye side are reflected on the surface of (the front surface of the lens) of the side opposite the eye side, whereby ultraviolet rays which come from the surface of the eye side are assuredly minimized. Thus it is possible to minimize ultraviolet rays into the interior of eyes.

The optical element prepared in Example 6 results in high reflectance against some light rays having a wavelength in the region of from 280 to 700 nm from the surface of the formed multilayer. However, the resulting phenomena are caused as follows: in order to decrease reflection against ultraviolet rays in the shorter wavelength region, which has been noted to tend to be highly injurious to human eyes, as well as to enhance actual viewing, reflectance of blue light is somewhat increased.

Further, it was confirmed that the optical element possessed an excellent electromagnetic wave decreasing function.

Example 7

In Example 5, data at the time of oblique incidence were measured. A flat plate test piece made of the same material used in Example 5 was used.

Figure 9:
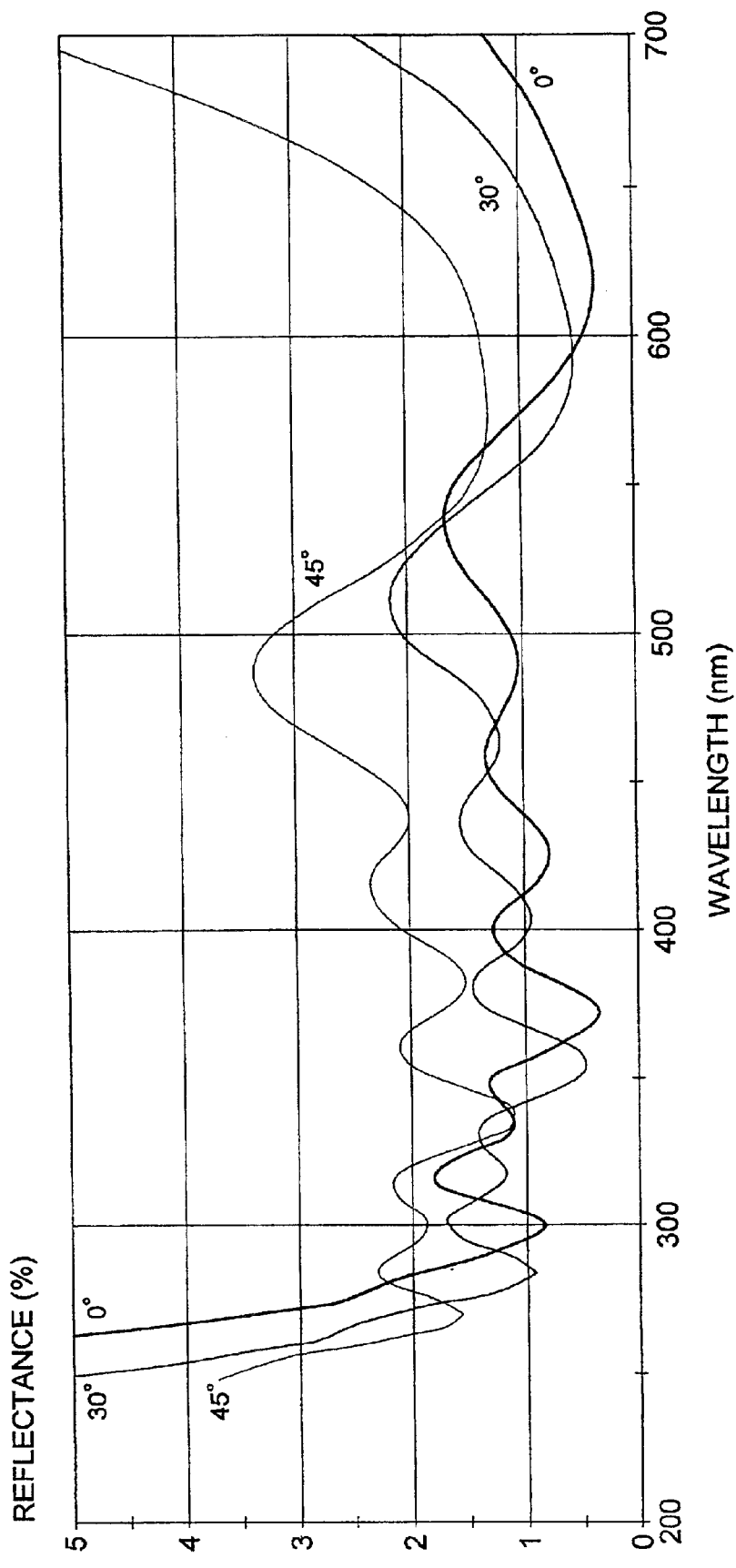
FIG. 9 is a spectral reflectance curve of the optical element prepared in Example 7.
Figure 10:
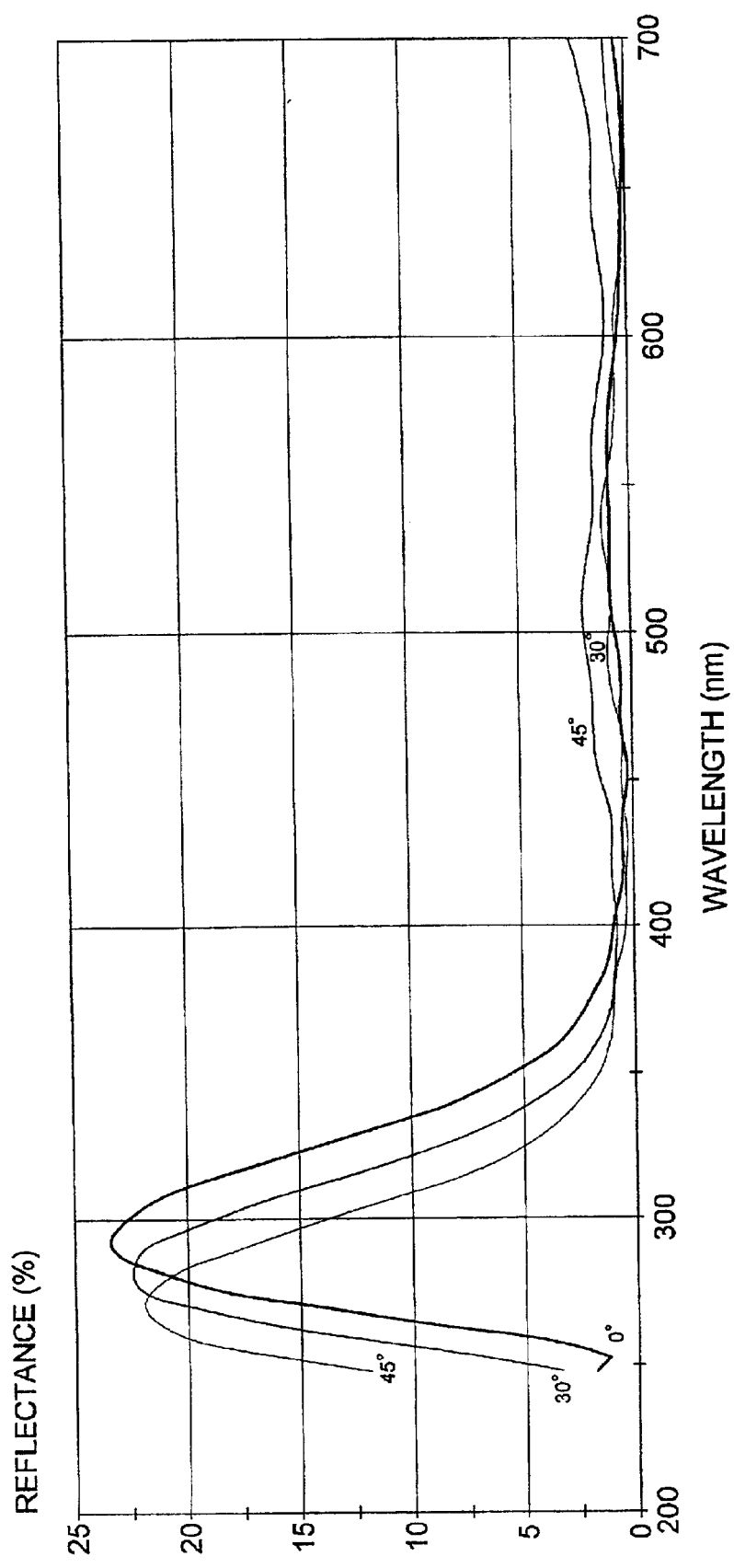
FIG. 10 is a spectral reflectance curve of the optical element prepared in Example 7.

The results are indicated in FIG. 9 (incident angle 0°, 30° and 45°: eye side) and FIG. 10 (incident angle 0°, 30° and 45°: object side).

According to the optical element of the present invention, reflectance, on the surface of the formed layer, of the entire light rays having wavelengths in the specified region becomes smaller than the reflectance on the surface of the base material itself. As a result, it is possible to decrease adverse effects due to the reflected light rays on the surface.

According to the eyeglass lens of the present invention, reflection of ultraviolet rays coming from behind the line of sight is assuredly minimized on the back surface of the lens. Thus, it is possible to minimize the entrance of the ultraviolet rays into the eye interior and consequently due to this, it is possible reduce the total amount of ultraviolet rays which enter the eye interior, and it is therefore possible to protect eyes from ultraviolet rays.

Disclosed embodiment can be varied by a skilled person without departing from the spirit and scope of the invention.

What is claimed is:

1. An optical element, comprising:
  a base material consisting of a lens; and
  a surface layer formed on at least one of the surfaces of the lens;
  wherein a reflectance of a surface of the formed layer for all light rays in a wavelength region of 280 nm to 315 nm and in a wavelength region of 420 nm to 680 nm is smaller than a reflectance of a surface of the base material, and
  wherein the layer is formed on the most image side-entire surface of the lens which surface is exposed to an outside environment so that when the light rays enter from the image side of the lens into the image side-entire surface of the lens, the surface layer minimizes an amount of light rays reflected from the image side-entire surface of the lens.

2. The optical element of claim 1, wherein the layer is made of substantially an inorganic material.

3. The optical element of claim 1, wherein a surface resistance of the layer is 1 MΩ/cm² or less.

4. The optical element of claim 1, wherein the lens is a lens for an eyeglass and the layer is formed on an eye side-entire surface of the lens.

5. The optical element of claim 1, wherein a reflectance of a surface of the formed layer for all light rays in a wavelength region of 280 nm to 400 nm and in a wavelength region of 420 nm to 680 nm is smaller than a reflectance of a surface of the base material.

6. The optical element of claim 1, wherein a reflectance of a surface of the formed layer for all light rays in a wavelength region of 280 nm to 700 nm is smaller than a reflectance of a surface of the base material.

7. The optical element of claim 1, wherein an absorptivity of the base material for at least a part of light rays in a wavelength of 280 nm to 400 nm is 30% or more.

8. The optical element of claim 1, wherein the lens has a selective absorptivity to absorb selectively a part of light rays in a wavelength region of 400 to 700 nm.

9. The optical element of claim 1, wherein the layer is a multi layer having plural layers.

10. The optical element of claim 1, wherein the layer comprises a transparent conductive layer.

11. The optical element of claim 1, wherein the layer comprises a metallic layer.

12. The optical element of claim 1, wherein a luminous transmittance of the base material and the layer is 75% or less.

13. The optical element of claim 1, wherein a difference between a luminous reflectance of the one surface and a luminous reflectance on the other optical surface of the optical element is 1% or less.

14. The optical element of claim 1, wherein
another layer is formed on an object side surface of the lens, and
wherein a difference between a wavelength showing a peak of a spectral reflectance on the image side surface and a wavelength showing a peak of a spectral reflectance on the object side surface in a wavelength region of 450 nm to 680 nm is ±5% or less and a difference between a peak reflectance on the image side surface and a peak reflectance on the object side surface in a wavelength region of 450 nm to 680 nm is 1% or less.

15. An eyeglass, comprising:
an optical element comprising
a base material consisting of a lens;
a surface layer formed on at least one of the surfaces of the lens; and
a lens holder to hold the lens;
wherein a reflectance of a surface of the formed layer for all light rays in a wavelength region of 280 nm to 315 nm and in a wavelength region of 420 nm to 680 nm is smaller than a reflectance of a surface of the lens, and
wherein the layer is formed on the most eye side entire surface of the eyeglass so that when the light rays enter from the eye side of the lens into the eye side-entire surface of the lens, the surface layer minimizes an amount of light rays reflected from the eye side-entire surface of the lens.

16. An optical element, comprising:
a base material; and
a layer formed on at least one of the surfaces of the base material;
wherein a reflectance of a surface of the formed layer for all light rays in a wavelength region of 280 nm to 315 nm and in a wavelength region of 420 nm to 680 nm is smaller than a reflectance of a surface of the base material,
wherein the layer comprises a transparent conductive layer, and
wherein the transparent conductive layer contains indium oxide.

17. An optical element, comprising:
a base material; and
a layer formed on at least one of the surfaces of the base material;
wherein a reflectance of a surface of the formed layer for all light rays in a wavelength region of 280 nm to 315 nm and in a wavelength region of 420 nm to 680 nm is smaller than a reflectance of a surface of the base material, and
wherein a luminous transmittance of the layer is 90% or more.

18. An optical element, comprising
a base material; and
a layer formed on at least one of the surfaces of the base material;
wherein a reflectance of a surface of the formed layer for all light rays in a wavelength region of 280 nm to 315 nm and in a wavelength region of 420 nm to 680 nm is smaller than a reflectance of a surface of the base material, and
wherein a spectral transmittance of the layer for all light rays in a wavelength region of 400 nm to 700 nm is 98% or more.

* * * * *